ial No. 223,822.

UNITED STATES PATENT OFFICE.

FRANK H. BRYANT, OF LOS ANGELES, CALIFORNIA.

METHOD OF PRESERVING BEETS.

1,273,732.  Specification of Letters Patent.  Patented July 23, 1918.

No Drawing.   Application filed March 21, 1918.  Serial No. 223,822.

*To all whom it may concern:*

Be it known that I, FRANK H. BRYANT, a citizen of the United States, residing at Los Angeles, in the county of Los Angeles and State of California, have invented new and useful Improvements in Methods of Preserving Beets, of which the following is a specification.

This invention relates to a method of preserving beets, so that they are adaptable for the manufacture of sugar and as a stock food.

In manufacturing sugar from beets, the beets are harvested and hauled to the factory, where they are immediately treated for the extraction and refining of the sugar. The harvest season and the period during which the factories operate, known as the campaign, extends over only a few months, usually three. During the remainder of the year, the machinery of the factory is idle. It is one of the objects of my invention to provide a process, whereby beets may be quickly and cheaply preserved, so that they may be held in storage and used for sugar manufacture during the entire year. The advantage of said steps in the manufacture of sugar from beets is obvious.

Due to the high percentage of carbohydrates in sugar beets, they are very desirable as a stock food, serving as a fattening agent. It is another object of my invention to provide a process of preserving beets, so that the product obtained is very tasty to the stock.

I accomplish these objects by extracting the greater part of the moisture from the beets, leaving the sugar and other food ingredients in a dry state.

More particularly, the process is carried out in the following manner: The beets are screened to separate the loose dirt therefrom. They are then washed preferably in a revolving wheel structure. The beets are next cut or divided. They may be cut into slices, cubes, V shapes, ribbons or shredded. The steps just described are those through which beet are commonly put to prepare them for the extraction of sugar.

The beets in their divided condition are next sweated by subjecting them to the action of steam so as to heat them and open their pores but not to cook them. They are then subjected to the action of hot air. The temperature of the air to which the beets are first subjected is low, in order to prevent the sugar from being drawn to the surface of the beets and forming a case hardened surface. When case hardening results, any moisture contained in the beets remains therein, eventually dissolving some of the sugar and permitting entrance of the air and a consequent decomposition of the beets. When the beets are case hardened, further subjection to heat will not result in the extraction of substantially any more moisture. For this reason the beets are first dried in a low temperature. The pores of the beets being open, the evaporation of moisture readily and quickly takes place.

The temperature of the air acting upon the beets is now slowly raised until the moisture has been evaporated and the sap and sugar have been thoroughly caked into the pulp. The final temperature is such that case hardening results. The sugar which fills the pores is dried and prevents entrance of air into the body of the beets, thereby assisting in preventing decomposition.

The above steps may be accomplished by first subjecting the beets to the direct action of steam in a compartment, then transferring the beets to a chamber through which hot air is circulated. A long chamber may be used and the beets gradually moved from the entrance of the chamber to the exit. The air is admitted into the exit end and discharged from the inlet end of the chamber. It is obvious that the air in its passage through the chamber will give up part of its heat, and that the temperature at the exit end will be much higher than at the inlet end. By gradually moving the beets from the inlet to the exit end of the chamber, the temperature to which they are subjected is gradually raised.

Instead of first subjecting the beets to the direct action of steam, the single long compartment may be used alone to accomplish this. The divided beets are introduced into the inlet end and moved gradually to the exit end. The hot air in passing over the beets will evaporate the moisture therefrom with the result that moisture is entrained by the air, and the beets at the inlet end are subjected to the hot moist air and thereby sweated. Various other instruments may be used to accomplish the sweating and heating of the beets. The particular instruments used are, however, no part of my invention.

The beets may now be stored for use in the manufacture of sugar. There has been no chemical reaction, so that all of the valuable ingredients of the beets have been retained in a dry condition. The beets in this condition may be used for the manufacture of sugar in the usual manner.

To prepare the beets as a food for stock, they are ground into a meal, which may be mixed with other substances to produce a balanced food.

Beets put through this process can be stored in a dry cool place and kept for years.

The dried beet product obtained has a larger proportion of sugar than when in the green state. Some of the non-sugar carbohydrates are changed to sugar. About four tons of green beets produce one ton of the dried product. This materially reduces the amount of machinery and the labor required in the sugar factory to handle the beets for the same output of sugar. The result is a very material decrease in the investment required in machinery and operation of the sugar plant.

What I claim is:

1. The process of treating beets, which consists in sweating them, and then subjecting them to the action of hot air for a comparatively long time, gradually increasing the temperature of the air.

2. The process of treating beets, which consists in dividing them, then sweating, and then subjecting them to the action of hot air for a comparatively long time, gradually increasing the temperature of said air.

3. The process of treating beets, which consists in progressively and slowly moving beets through a current of hot air toward the source of air supply.

4. The process of treating beets, which consists in dividing them, then progressively and slowly moving them through a current of hot air toward the source of air supply.

In witness that I claim the foregoing I have hereunto subscribed my name this 16th day of March, 1918.

FRANK H. BRYANT.